US011751089B2

(12) United States Patent
Huang et al.

(10) Patent No.: US 11,751,089 B2
(45) Date of Patent: Sep. 5, 2023

(54) WIRELESS RELAY SYSTEM, WIRELESS RELAY METHOD AND BASE STATION APPARATUS

(71) Applicant: NIPPON TELEGRAPH AND TELEPHONE CORPORATION, Tokyo (JP)

(72) Inventors: Chunhsiang Huang, Musashino (JP); Yushi Shirato, Musashino (JP); Nobuaki Otsuki, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 186 days.

(21) Appl. No.: 17/415,915

(22) PCT Filed: Dec. 11, 2019

(86) PCT No.: PCT/JP2019/048376
§ 371 (c)(1),
(2) Date: Jun. 18, 2021

(87) PCT Pub. No.: WO2020/129761
PCT Pub. Date: Jun. 25, 2020

(65) Prior Publication Data
US 2022/0070719 A1 Mar. 3, 2022

(30) Foreign Application Priority Data

Dec. 21, 2018 (JP) .................................. 2018-239858

(51) Int. Cl.
*H04B 7/155* (2006.01)
*H04W 40/22* (2009.01)
(Continued)

(52) U.S. Cl.
CPC ........ *H04W 28/0236* (2013.01); *H04B 7/155* (2013.01); *H04W 16/28* (2013.01);
(Continued)

(58) Field of Classification Search
CPC ............. H04W 40/22; H04W 36/0005; H04W 36/0009; H04W 36/0069; H04W 36/02;
(Continued)

(56) References Cited

U.S. PATENT DOCUMENTS

| 2011/0134828 A1* | 6/2011 | Osseiran | ............ H04B 7/15521 |
| | | | 370/315 |
| 2014/0254469 A1* | 9/2014 | Stephens | .............. H04B 7/0617 |
| | | | 370/315 |

FOREIGN PATENT DOCUMENTS

| JP | 2010252292 A | 11/2010 |
| JP | 2011250015 A | 12/2011 |

OTHER PUBLICATIONS

R. Khan, I. Altunbas and G. K. Kurt, "Enhanced XOR network coding scheme with OFDM for two-way relay networks," 2016 24th Telecommunications Forum (TELFOR), Belgrade, Serbia, 2016, pp. 1-4, doi: 10.1109/TELFOR.2016.7818781. (Year: 2016).*

(Continued)

*Primary Examiner* — Gary Mui
(74) *Attorney, Agent, or Firm* — Harness, Dickey & Pierce, P.L.C.

(57) ABSTRACT

Provided is a wireless relay system including multiple terminal station apparatuses and a base station apparatus. The base station apparatus includes: a base station reception unit that respectively receives pieces of upstream data traffic from the multiple terminal station apparatuses; an encoding unit that, if pieces of upstream data traffic that require mutual forwarding in opposite directions are present in the respective pieces of upstream data traffic, performs network encod- (Continued)

ing on the respective pieces of upstream data traffic such that the pieces of upstream data traffic are pieces of data traffic of mutually identical content; and a base station transmission unit that simultaneously transmits encoded data traffic as downstream data traffic to the multiple terminal station apparatuses. The terminal station apparatuses each include: a terminal station transmission unit that transmits the upstream data traffic to the base station apparatus; a terminal station reception unit that receives the encoded data traffic; and a decoding unit that decodes the encoded data traffic using the upstream data traffic.

8 Claims, 11 Drawing Sheets

(51) Int. Cl.
    *H04W 28/02* (2009.01)
    *H04W 16/28* (2009.01)
    *H04W 16/32* (2009.01)
    H04L 5/00 (2006.01)
    H04L 5/14 (2006.01)
(52) U.S. Cl.
    CPC ........... *H04W 16/32* (2013.01); *H04L 5/0001* (2013.01); *H04L 5/14* (2013.01)

(58) Field of Classification Search
    CPC ............... H04W 16/28; H04B 7/155; H04B 7/15521; H04B 7/0452; H04L 5/0001; H04L 5/14
    See application file for complete search history.

(56) References Cited

OTHER PUBLICATIONS

Zhen Gao et al., MmWave Massive-MIMO-Based Wireless Backhaul for the 5G Ultra-Dense Network, IEEE Wireless Communications, Oct. 2015, pp. 13-21.

Atsushi Ohta et al., High Efficient Spatial Division Multiplexing Technique with the First Eigen-mode parallel transmission on millimeter wave band in LOS environment—Basic Concept and Its Performance Evaluation—, IEICE Technical Report, vol. 115, No. 181, 2015, pp. 73-78.

European Telecommunications Standards Institute, 3GPP TS 36.300 version 13.9.0 Release 13, ETSI TS 136 300 V13.9.0, Oct. 2017, p. 110.

* cited by examiner

Fig. 6

| FORWARDING DATA TRAFFIC ID | HANDOVER SOURCE (TERMINAL STATION IDENTIFIER) | HANDOVER TARGET (TERMINAL STATION IDENTIFIER) |
|---|---|---|
| 1 | Small Cell BS#1 (TERMINAL STATION A) | Small Cell BS#2 (TERMINAL STATION B) |
| 2 | Small Cell BS#2 (TERMINAL STATION B) | Small Cell BS#1 (TERMINAL STATION A) |
| 3 | Small Cell BS#1 (TERMINAL STATION A) | Small Cell BS#3 (TERMINAL STATION C) |
| 4 | Small Cell BS#3 (TERMINAL STATION C) | Small Cell BS#1 (TERMINAL STATION A) |
| ⋮ | ⋮ | ⋮ |

WIRELESS RELAY SYSTEM, WIRELESS RELAY METHOD AND BASE STATION APPARATUS

CROSS-REFERENCE TO RELATED APPLICATIONS

This application is a 371 U.S. National Phase of International Application No. PCT/JP2019/048376 filed on Dec. 11, 2019, which claims priority to Japanese Application No. 2018-239858 filed on Dec. 21, 2018. The entire disclosures of the above applications are incorporated herein by reference.

TECHNICAL FIELD

The present invention relates to a wireless relay system, a wireless relay method, and a base station apparatus.

BACKGROUND ART

Consideration has been given to backhaul transmission being performed by a millimeter-wave band wireless relay system to a small cell of a mobile network. For example, in a millimeter-wave band wireless relay system disclosed in NPL 1, a macro-cell installed at a high altitude (hereinafter referred to as "Macro-Cell BS") performs beam forming using many antenna arrays, and divides a space using beams having sharp directivity. This kind of communication scheme in which a Macro-Cell BS and multiple small cells (hereinafter referred to as "small-Cell BS") located in mutually different spaces (azimuths) perform wireless communication in parallel at the same frequency is called an SDMA (Space-Division Multiple Access) scheme.

Also, for example, in the millimeter-wave band wireless relay system according to NPL 2, a base station is equipped with multiple antenna arrays (hereinafter referred to as "sub-arrays"). The multiple sub-arrays form beams that are independent of each other and respectively communicate with terminal stations. In the base station according to NPL 2, reference frequencies (local signals) that are independent of each other are used in the sub-arrays. At this time, if the installation interval of the sub-arrays is longer than the wavelength of the radio waves, beams having sharp directivity can be formed with respect to a desired azimuth, but unneeded radio waves (grating lobes) will also be radiated at an azimuth that is rot the desired azimuth. With millimeter-wave band wireless relay system using the SDMA scheme, due to these grating lobes, when performing transmission in a downstream direction from a base station to a terminal station, the terminal station receives not only the radio waves transmitted from the sub-arrays of the base station at the desired azimuth, but also unneeded radio waves transmitted from the sub-arrays of the base station at an azimuth that is not the desired azimuth in some cases. For example, if an ideal millimeter-wave band wireless relay system using the SEMA scheme cannot be constructed due to conditions such as the installation intervals between the base station and the terminal stations, communication quality deteriorates in the terminal stations due to interference caused by the unneeded radio waves.

CITATION LIST

Non-Patent Literature

[NPL 1] Zhen Gao, et al., "Mm Wave Massive-MIMO-Based Wireless Backhaul for the 5G Ultra-Dense Network", IEEE Wireless Communications, pp. 13-21, October 2015.

[NPL 2] A. Ohta, "High Efficient Spatial Division Multiplexing Technique with the First Eigen-mode Parallel Transmission on Millimeter Wave Band in LOS Environment: Basic Concept and Its Performance Evaluation", IEICE Technical Report RCS 2015-144, pp. 73-76, The Institute of Electronics, Information and Communication Engineers, August 2015.

[NPL 3] "LTE; Evolved Universal Terrestrial Radio Access (E-UTRA) and Evolved Universal Terrestrial Radio Access Network (E-UTRAN); Overall description; Stage 2 (3GPP TS 36.300 version 13.9.0 Release 13)", ETSI TS 136 300, p. 110, October 2017.

SUMMARY OF THE INVENTION

Technical Problem

As described above, if an ideal millimeter-wave band wireless relay system using an SDMA scheme cannot be constructed, radio-wave interference may occur in the terminal stations. Also, radio-wave interference in a millimeter-wave wireless relay system is worsened in some cases due to data traffic fluctuations in a Small-Cell BS connected to the terminal station or a Marco-Cell BS. Specific examples of data traffic fluctuations that cause worsening of interference include data traffic fluctuations caused by movement of an end user within wireless coverage (a range in which reception is possible), in the case of a Small-Cell BS. Due to the end user moving, handover in the mobile network is necessary.

When handover is performed, control signals for the mobile network and data traffic to an end user are forwarded between the multiple Small-Cell BSs and the Macro-Cell BS. Accordingly, a large amount of communication requests is concentrated in a short amount of time, and interference power increases. For this reason, there is a problem in that the communication quality in a millimeter-wave band wireless relay system dramatically decreases in some cases.

The present invention was made in view of the above-described technical background, and aims to provide a technique according to which it is possible to improve communication quality.

Means for Solving the Problem

One aspect of the present invention is a wireless relay system including a plurality of terminal station apparatuses and c base station apparatus configured to relay data traffic transmitted through wireless communication between the plurality of terminal station apparatuses, in which the base station apparatus includes: a base station reception unit configured to receive pieces of upstream data traffic from the plurality of terminal station apparatuses; an encoding unit configured to, if the pieces of upstream data traffic that require mutual forwarding in opposing directions between the plurality of terminal station apparatuses are present in the respective pieces of upstream data traffic received by the base station reception unit, perform network encoding on the respective pieces of upstream data traffic such that the pieces of upstream data traffic are pieces of data traffic of mutually identical content; and a base station transmission unit configured to simultaneously transmit pieces of encoded data traffic indicating the pieces of data traffic subjected to network encoding by the encoding unit as downstream data traffic to the plurality of terminal station apparatuses that transmitted the pieces of upstream data traffic, and the terminal station apparatuses each include: a terminal station transmission unit configured to transmit the upstream data traffic to the base station apparatus; a terminal station reception unit configured to receive the pieces of encoded data traffic transmitted from the base station apparatus; and a decoding unit configured to decode the pieces of encoded data traffic received by the terminal station reception unit using the upstream data traffic transmitted by the terminal station transmission unit.

Also, one aspect of the present invention is the above-described wireless relay system, in which the encoding unit performs network encoding by calculating exclusive-OF for a bit string of the pieces of upstream data traffic, and the decoding unit performs decoding by calculating exclusive-OR for the pieces of encoded data traffic and the upstream data traffic.

Also, one aspect of the present invention is the above-described wireless relay system, in which the base station transmission unit transmits the pieces of encoded data traffic to the plurality of terminal station apparatuses by performing beam forming.

Also, one aspect of the present invention is the above-described wireless relay system, in which the base station apparatus performs communication with the plurality of terminal station apparatuses using a communication scheme according to a space-division multiple access scheme.

Also, one aspect of the present invention is the above-described wireless relay system, in which the base station apparatus and the terminal station apparatuses perform communication with each other using a communication scheme according to a time-division duplexing scheme.

Also, one aspect of the present invention is the above-described wireless relay system, in which the data traffic includes a control signal to be used for handover between the plurality of terminal station apparatuses.

Also, one aspect of the present invention is a wireless relay method performed by a wireless relay system including a plurality of terminal station apparatuses and a base station apparatus configured to relay data traffic transmitted through wireless communication between the plurality of terminal station apparatuses, the method including: a terminal station transmission step in which the terminal station apparatuses transmit pieces of upstream data traffic to the base station apparatus; a base station reception step in which the base station apparatus receives the pieces of upstream data traffic from the plurality of terminal station apparatuses; an encoding step in which, if the pieces of upstream data traffic that require mutual forwarding in opposing directions between the plurality of terminal station apparatuses are present in the respective pieces of upstream data traffic received through the base station reception step, the base station apparatus performs network encoding on the respective pieces of upstream data traffic such that the pieces of upstream data traffic are pieces of data traffic of mutually identical content; a base station transmission step in which the base station apparatus simultaneously transmits respective pieces of encoded data traffic indicating the pieces of data traffic subjected to network encoding through the encoding step as downstream data traffic to the plurality of terminal station apparatuses that transmitted the pieces of upstream data traffic; a terminal station reception step in which the terminal station apparatuses receive the pieces of encoded data traffic transmitted from the base station apparatus; and a decoding step in which the terminal station apparatuses decode the pieces of encoded data traffic received through the terminal station reception step using the pieces of upstream data traffic transmitted through the terminal station transmission stop.

Also, one aspect of the present invention is a base station apparatus configured to relay data traffic transmitted through wireless communication between a plurality of terminal station apparatuses, the base station apparatus including: a base station reception unit configured to receive pieces of upstream data traffic from the plurality of terminal station apparatuses; an encoding unit configured to, if the pieces of upstream data traffic that require mutual forwarding in opposing directions between the plurality of terminal station apparatuses are present in the respective pieces or upstream data traffic received by the base station reception unit, perform network encoding on the respective pieces of upstream data traffic such that the pieces of upstream data traffic are pieces of data traffic of mutually identical content; and a base station transmission unit configured to simultaneously transmit pieces of encoded data traffic indicating the pieces of data traffic subjected to network encoding by the encoding unit as downstream data traffic to the plurality of terminal station apparatuses that transmitted the pieces of upstream data traffic.

Effects of the Invention

With the present invention, it is possible to improve communication quality.

BRIEF DESCRIPTION OF DRAWINGS

FIG. 6 is a diagram showing an example of a table stored by a terminal station forwarding address storage unit 111a of the wireless relay system 1 of the first embodiment of the present invention.

DESCRIPTION OF EMBODIMENTS

First Embodiment

Hereinafter, a first embodiment of the present invention will be described with reference to the drawings.

[Configuration of Wireless Relay System]

Hereinafter, an overview of a configuration of a wireless relay system 1 will be described.

Figure 1:
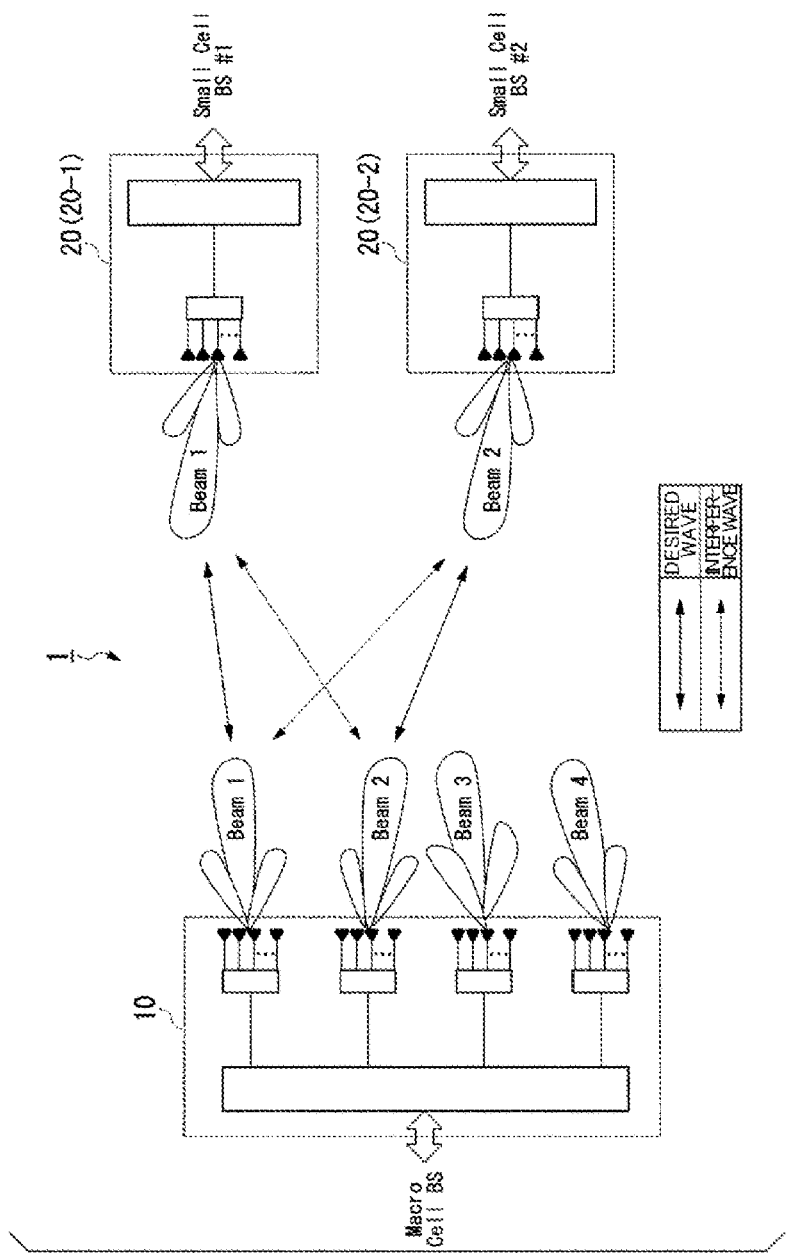
FIG. 1 is a schematic diagram showing an example of line connections through a wireless relay system 1 according to a first embodiment of the present invention.

FIG. 1 is a schematic diagram showing an example of line connections obtained through the wireless relay system 1 according to the first embodiment of the present invention. The wireless relay system 1 according to the present embodiment is a millimeter-wave band wireless relay system. As shown in FIG. 1, the wireless relay system 1 is constituted by including one base station apparatus 10 and multiple terminal station apparatuses 20 (in the example shown in FIG. 1, two terminal station apparatuses 20 (20-1, 20-2)). In the wireless relay system 1, communication is performed by subjecting the one base station apparatus and the multiple terminal station apparatuses 20 to communication connection using an SDMA scheme. Note that it as assumed that the base station apparatus 10 and the terminal station apparatuses 20 are all fixed.

The base station apparatus 10 and the terminal station apparatus 20-1 perform communication connection with each other via a Beam 1. Also, the base station apparatus 10 and the terminal station apparatus 20-2 performing communication connection with each other via a Beam 2. However, as shown in FIG. 1, unneeded radio waves (grating lobes) are also radiated at azimuths that are not desired azimuths from the sub-arrays of the base station apparatus 10 and the terminal station apparatuses 20. Accordingly, radio-wave interference occurs. In FIG. 1, the solid-line arrows indicate radio waves (desired waves) at desired azimuths, and the broken-line arrows indicate grating lobes (interference waves). Note that the communication scheme that is used in two-way transmission between the base station apparatus 10 and the terminal station apparatuses 20 is, for example, a TDD (Time-Division Duplexing) scheme.

[Configuration of Base Station Apparatus]

Hereinafter, a configuration of a base station apparatus 10 will be described.

Figure 2:
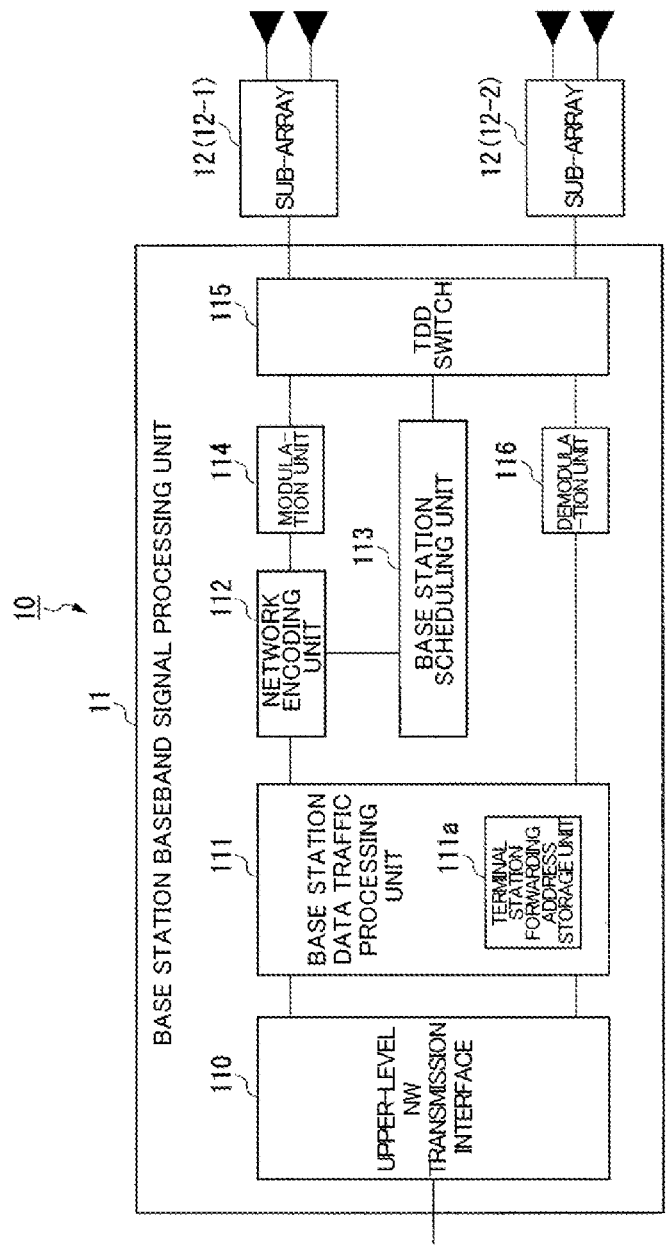
FIG. 2 is a block diagram showing a configuration of a base station apparatus 10 of the wireless relay system 1 according to the first embodiment of the present invention.

FIG. 2 is a block diagram showing a configuration of the base station apparatus 10 of the wireless relay system 1 according to the first embodiment of the present invention. As shown in FIG. 2, the base station apparatus 10 is constituted by including a base station baseband signal processing unit 11 and two sub-arrays 12 (sub-array 12-1 and sub-array 12-2).

As shown in FIG. 2, the base station baseband signal processing unit 11 is constituted by including an upper-level network (NW) transmission interface 110, a base station data traffic processing unit 111, a network encoding unit 112, a base station scheduling unit 113, a modulation unit 114, a TDD switch 115, and a demodulation unit 116.

The upper-level NW transmission interface 110 is a communication interface for performing communication connection to an upper-level communication node (e.g., as shown in FIG. 1, a Macro-Cell BS or the like). The upper-level NW transmission interface 110 receives input of the downstream data traffic from the upper-level communication node, and outputs the input downstream data traffic to the base station data traffic processing unit 111. Also, the upper-level NM transmission interface 110 receives input of upstream data traffic from the base station data traffic processing unit 111, and outputs the input upstream data traffic to the upper-level communication node.

The base station data traffic processing unit 111 receives input of the downstream data traffic from the upper-level NW transmission interface 110. The base station data traffic processing unit 111 acquires address information that is needed in forwarding of downstream data traffic to the terminal station apparatuses 20 by reading out a control message included in the input downstream data traffic. The base station data traffic processing unit ill outputs the acquired address information and the downstream data traffic to the network encoding unit 112. Also, the base station data traffic processing unit 111 includes a later-described terminal station forwarding address storage unit 111*a*.

The network encoding unit 112 (encoding unit) receives input of the address information and the downstream data traffic from the base station data traffic processing unit 111. The network encoding unit 112 performs determination of whether or not network encoding in the downstream transmission to the terminal station apparatuses 20 is needed based on the input address information. If it is determined that network encoding is needed, the network encoding unit 112 transmits an instruction for starting network encoding to the terminal station apparatuses 20 via the modulation unit 14, the TDD switch 11S, and the sub-arrays 12. The TDD switch 115 is a communication interface for performing communication connection to the sub-arrays 12. Also, the network encoding unit 112 includes an encoding processing function for performing network encoding on the downstream data traffic to be transmitted to the multiple terminal station apparatuses 20 serving as destinations.

The base station scheduling unit 113 performs scheduling of transmission of the data traffic. By controlling the TDD switch 15 based on the determined schedule, the base station scheduling unit 113 controls the downstream transmission times (time slots) and upstream transmission times (time slots) between the base station apparatus 10 and the terminal station apparatuses 20 via the sub-arrays 12.

Upon receiving input of the modulated baseband signals from the base station baseband signal processing unit 11, the sub-arrays 12 convert the input baseband signals to the frequency needed for wireless transmission. Also, the sub-arrays 12 electrically adjust the weighting of each antenna element. Then, the sub-arrays 12 (base station transmission units) output the modulated wireless signals to the terminal station apparatuses 20 that are the connection destinations using the sub-arrays that can perform directivity communication. Also, upon receiving input of the wireless signals from the terminal station apparatuses 20, the sub-arrays 12 (base station reception units) convert the wireless signals into baseband signals. Then, the sub-arrays 12 output the converted baseband signals to the base station baseband signal processing unit 11.

The demodulation unit 116 acquires the baseband signals output from the sub-arrays 12 via the TDD switch 115. The demodulation unit 116 demodulates the acquired baseband signals to acquire the upstream data traffic. Then, the demodulation unit 116 outputs the acquired upstream data traffic to the upper-level communication node via the base station data traffic processing unit 111 and the upper-level NW transmission interface 110.

(Configuration of Terminal Station Apparatus)

Hereinafter, a configuration of the terminal station apparatus 20 will be described.

Figure 3:
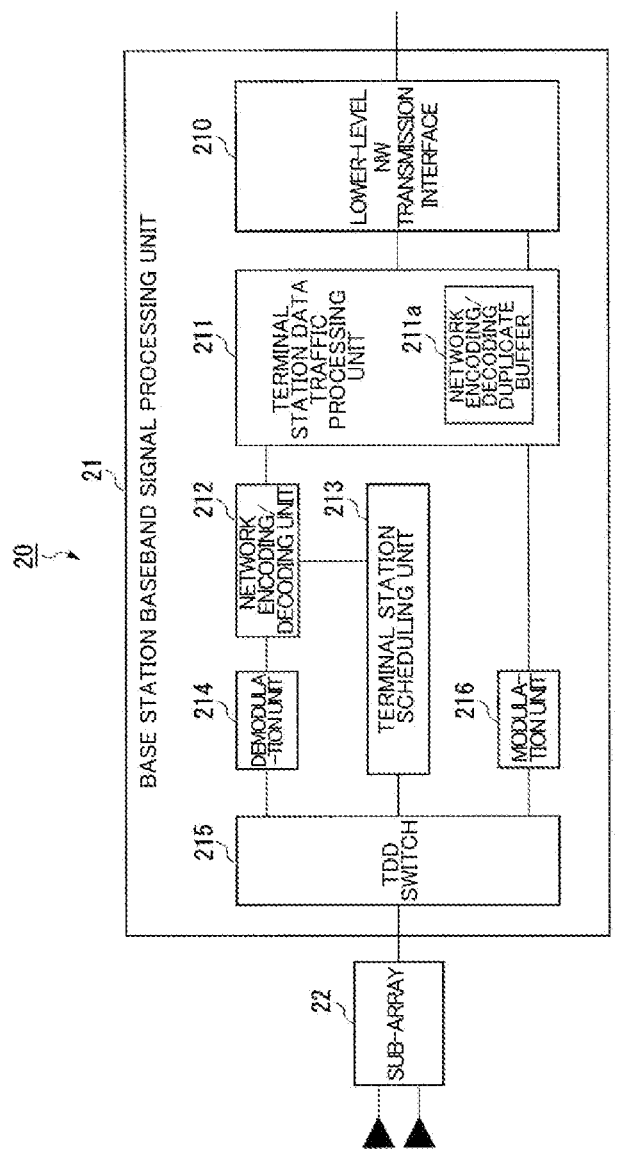
FIG. 3 is a block diagram showing a configuration of a terminal station apparatus 20 of the wireless relay system 1 according to the first embodiment of the present invention.

FIG. 3 is a block diagram showing a configuration of the terminal station apparatus 20 of the wireless relay system 1 according to the first embodiment of the present invention.

As shown in FIG. 3, the terminal station apparatus 20 is constituted by including a terminal station baseband signal processing unit 21 and a sub-array 22.

As shown in FIG. 3, the terminal station baseband signal processing unit 21 is constituted by including a lower-level network (NM) transmission interface 210, a terminal station data traffic processing unit 211, a network encoding/decoding unit 212, a terminal station scheduling unit 213, a demodulation unit 214, a TDD switch 215, and a modulation unit 216.

The lower-level NW transmission interface 210 is a communication interface for performing communication connection to a lower-level communication node (e.g., as shown in FIG. 1, a Small-Cell BS, or the like). The lower-level NW transmission interface 210 receives input of downstream data traffic from the terminal station data traffic processing unit 211 and outputs the input downstream data traffic to a lower-level communication node. Also, the lower-level NW transmission interface 210 receives input of upstream data traffic from the lower-level communication node, and outputs the input upstream data traffic to the terminal station data traffic processing unit 211.

The network encoding/decoding unit 212 performs decoding processing on the network-encoded downstream data traffic (encoded data traffic) that was input wirelessly, in correspondence with an advance notification from the base station apparatus 10. The network encoding/decoding unit 212 outputs the decoding processing result (data traffic forwarded in opposing directions) to the terminal station data traffic processing unit 211.

As shown in FIG. 3, the terminal station data traffic processing unit 211 is constituted by including a network encoding/decoding duplicate buffer 211a. The terminal station data traffic processing unit 211 stores (buffers) some of the upstream data traffic that is needed in the decoding processing of the network-encoded downstream data traffic (encoded data traffic) input from the network encoding/decoding unit 212 in the network encoding/decoding duplicate buffer 211a.

The terminal station scheduling unit 213 controls downstream transmission and upstream transmission between the base station apparatus 10 and the terminal station apparatus 20 via the sub-array 22 (terminal station transmission unit, terminal station reception until by controlling the TDD switch 215 based on an instruction from the base station scheduling unit 113 of the base station baseband signal processing unit 11. The TDD switch 215 is a communication interface for performing communication connection to the sub-arrays 22.

[Communication Scheduling between Base Station Apparatus and Terminal Station Apparatus]

Hereinafter, communication scheduling between the base station apparatus 10 and the terminal station apparatuses 20 (20-1, 20-2) of the wireless relay system 1 shown in FIG. 1 will be described.

Figure 4:
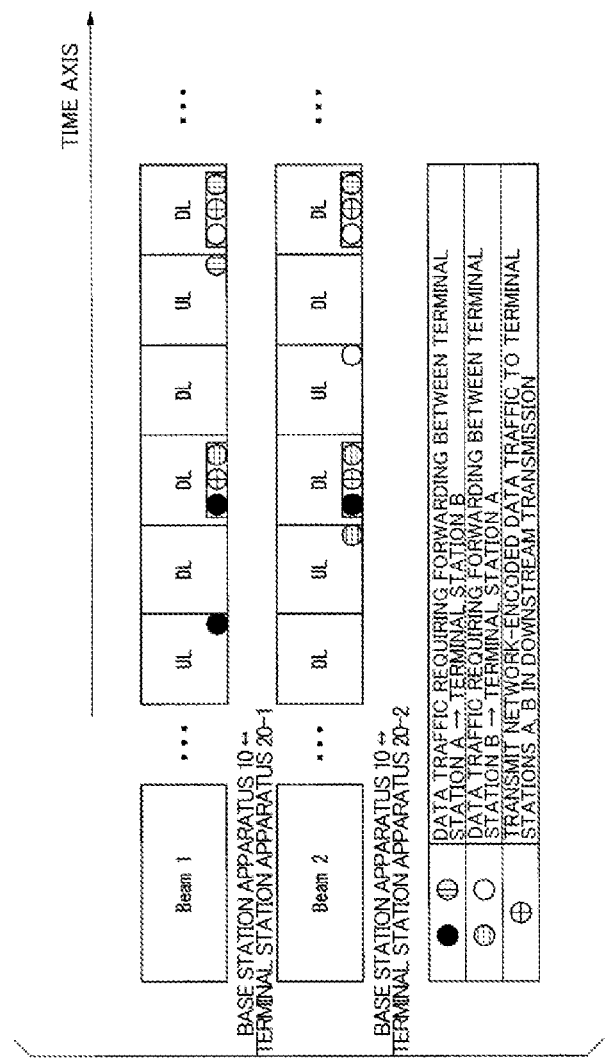
FIG. 4 is a diagram showing an example of communication scheduling in the wireless relay system 1 according to the first embodiment of the present invention.

FIG. 4 is a diagram showing an example of communication scheduling in the wireless relay system 1 according to the first embodiment of the present invention.

The base station apparatus 10 and the terminal station apparatus 20-1 form a Beam 1 that has directivity, and the base station apparatus 10 and the terminal station apparatus 20-2 form a Beam 2 that has directivity, and thereby the time axis is divided using the SDMA scheme and wireless communication from downstream transmission and upstream transmission is performed.

In FIG. 4, the time slot described as "UL" (Upload) indicates upstream transmission (transmission in which the terminal station apparatus 20 transmits and the base station apparatus 10 receives, and the time slot described as "DL" (Download) indicates downstream transmission (transmission in which the base station apparatus 10 transmits and the terminal station apparatuses 20 receive).

If an ideal wireless relay system using an SDMA scheme cannot be constructed, as shown in FIG. 1, the Beam 1 and the Beam 2 that are adjacent to each other mutually cause radio-wave interference in some cases. In the example shown in FIG. 4, the base station scheduling unit 113 and the terminal station scheduling unit 213 allocate time slots in the adjacent Beam 1 and Beam 2 such that the upstream transmission (UL) and the downstream transmission (DL) are at alternate timings.

However, if pieces of data traffic that require mutual forwarding between the Beam 1 and the Beam 2 that are adjacent to each other are present, the base station apparatus 10 performs network encoding on those pieces of data traffic. The base station apparatus 10 forwards the network-encoded data traffic as downstream data traffic to the terminal station apparatus 20-1 and the terminal station apparatus 20-2 in the same time slot. The terminal station apparatus 20 obtains the data traffic needed by the terminal station apparatus 20 by receiving this network-encoded downstream data traffic (encoded data traffic) and decoding the network-encoded downstream data traffic (encoded data traffic).

Note that in downstream transmission from the base station apparatus 10 to the terminal station apparatus 20, network encoding does not need to be performed on all downstream data traffic. If pieces of data traffic that require mutual forwarding between two terminal station apparatuses 20 are not present, the data traffic need only be forwarded without performing network encoding.

[Operations in Network Encoding and Decoding]

Hereinafter, operations related to network encoding and decoding in the base station apparatus 10 and the terminal station apparatuses 20 will be described. The base station apparatus 10 monitors whether or not there are pieces of data traffic that require mutual forwarding between two terminal station apparatuses 20 using the base station data traffic processing until 111 shown in FIG. 2 and determines whether or not to perform network encoding on the data traffic for downstream transmission.

Figure 5:
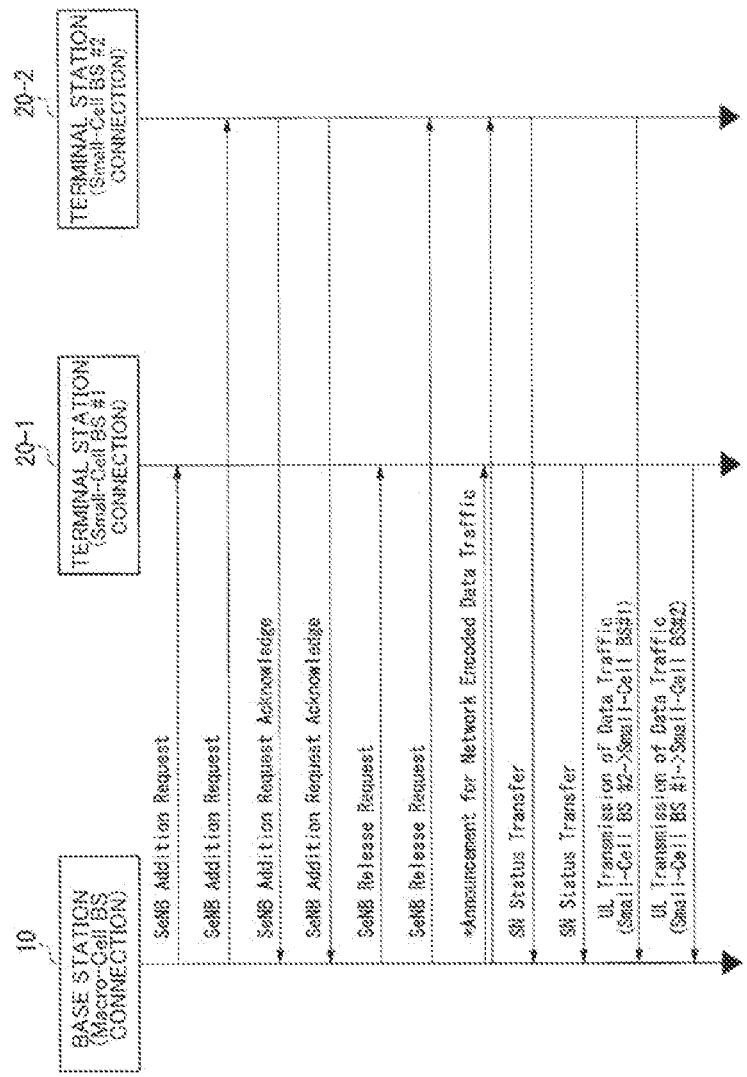
FIG. 5 is a sequence diagram showing an example of monitoring control performed by the base station apparatus 10 of the wireless relay system 1 according to the first embodiment of the present invention.

FIG. 5 is a sequence diagram showing an example of monitoring control performed by the base station apparatus 10 of the wireless relay system 1 according to the first embodiment of the present invention. Here, as shown in FIG. 1, a case is envisioned in which data traffic is mutually forwarded between the terminal station apparatus 2-1 (connected to a Small-Cell BS #1 and a terminal station apparatus 20-2 (connected to a Small-Cell BS #2). For example, the subject monitored by the base station apparatus 10 is a message (control signal) to be exchanged between a communication node serving as a handover source and a communication node serving as a handover target during handover in a mobile network standardized in NPL 3.

The base station apparatus 10 records an SeNB Release address (handover source) that is to be transmitted to a terminal station apparatus 20 (and a Small-Cell BS connected at a lower level), and an address that is a handover target included in the SeNB Release message. Information indicating this address is stored in the terminal station forwarding address storage unit 111a included in the base station data traffic processing unit ill of the base station baseband signal processing unit 11.

FIG. 6 is a diagram showing an example of a table stored in the terminal station forwarding address storage unit 111a of the wireless relay system 1 according to the first embodiment of the present invention. As shown in FIG. 6, the table stored in the terminal station forwarding address storage unit 111*a* is data in which an ID (Identifier) for identifying the data traffic to be forwarded between multiple terminal station apparatuses 20, an identifier (terminal station identifier) for identifying a handover source/and an identifier (terminal station identifier) for identifying the handover target are associated with each other.

Note that in order to make the description easier to understand, the table shown m FIG. 6 expresses information indicating addresses of forwarding data traffic with text format information, such as "Small-Cell BS #1", "Small-Cell BS #2", . . . , or "terminal station A", "terminal station B", . . . . However, for example, the information indicating the addresses stored it the terminal station forwarding address storage unit 111*a* may also be an IP address (Internet Protocol Address), a MAC address (Media Access Control Address), or another identifier, according to which an upper-level communication node can uniquely identify a lower-level communication node.

As described above, the base station apparatus 10 can check whether or not there are pieces of data traffic that require mutual forwarding between the multiple terminal station apparatuses 20. The base station apparatus 10 performs notification of the fact that network encoding processing is to be performed before performing downward transmission to the terminal station apparatus 20-1 and the terminal station apparatus 20-2 having the pieces of data traffic that require mutual forwarding (*Announcement for Network Encoded Data Traffic message in FIG. 5).

The terminal station apparatus 20-1 and the terminal station apparatus 20-2 that received the notification of the *Announcement for Network Encoded Data Traffic message perform preparation for decoding processing on the network-encoded downward data traffic (encoded data traffic). The terminal station apparatus 20-1 and the terminal station apparatus 20-2 forward SeNB Release messages to lower-level communication nodes (Small-Cell BSs) and thereafter receive the pieces of data traffic that require forwarding to the other Small-Cell BSs from the lower-level communication nodes.

The terminal station apparatus 20-1 and the terminal station apparatus 20-2 acquire the data traffic forwarded between these multiple Small-Cell BSs and store duplicates in the network encoding/decoding duplicate buffers 211*a* of the terminal station baseband signal processing units 21 shown in FIG. 3. This duplicate is used when decoding the network-encoded downstream data traffic (encoded data traffic) to be transmitted from, the base station apparatus 10 in the next time.

Figure 7:
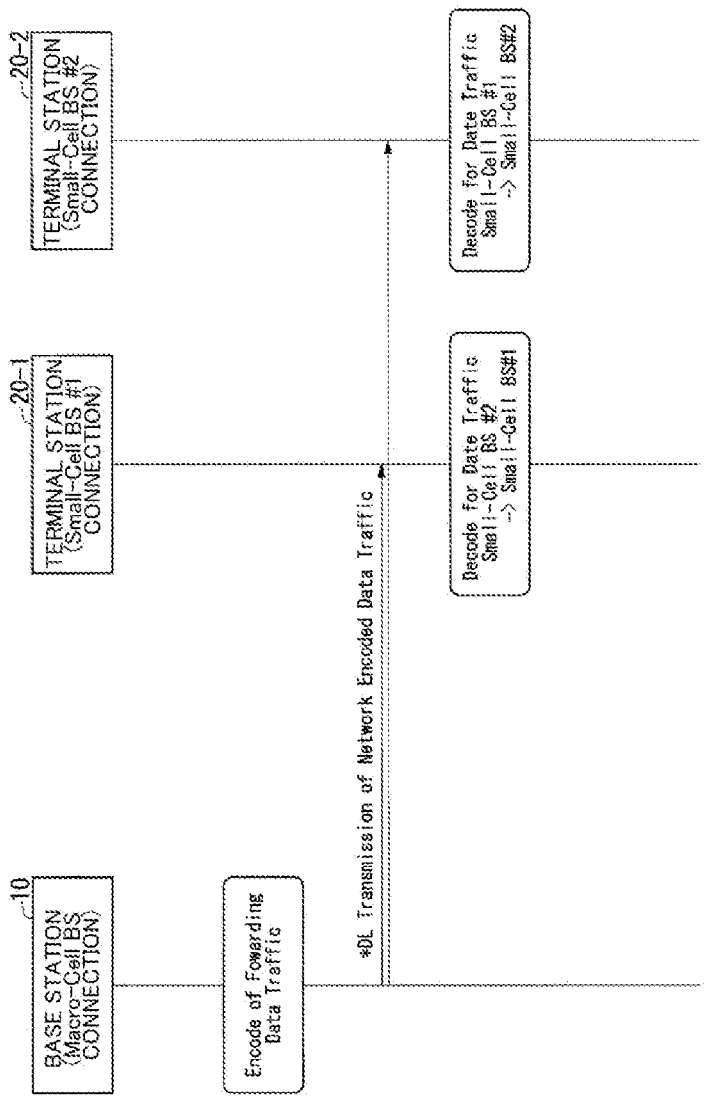
FIG. 7 is a sequence diagram showing an example of operations for network encoding and decoding performed by the wireless relay system 1 according to the first embodiment of the present invention.

As shown in FIG. 5, in upstream transmission, the terminal station apparatus 20-1 and the terminal station apparatus 20-2 transmit, to the base station apparatus 10, SN Status Transfer messages indicating the range of a Sequence Number (forwarding data traffic ID) of the data traffic that requires forwarding, and the data traffic. After receiving the data traffic that requires forwarding, the base station apparatus 10 transmits the data traffic to the upper-level communication node (Macro-Cell BS). Then, the base station apparatus 10 once again acquires the same data traffic that requires forwarding from the upper-level communication node, FIG. 7 is a sequence diagram showing an example of operations for network encoding and decoding performed by the wireless relay system 1 according to the first embodiment of the present invention. The base station apparatus 10 performs network encoding processing on the data traffic of the number corresponding to the SN Status Transfer, and transmits the network-encoded downstream data traffic (*DL Transmission of Network Encoded Data Traffic in FIG. 7) to the terminal station apparatus 20-1 and the terminal station apparatus 20-2 in the time slots determined by the base station scheduling unit 113.

[Processing Flow of Functional Units in Base Station Apparatus]

The following indicates an example of operations of functional units of the base station apparatus 10 in transmission processing through network encoding.

Figure 8:
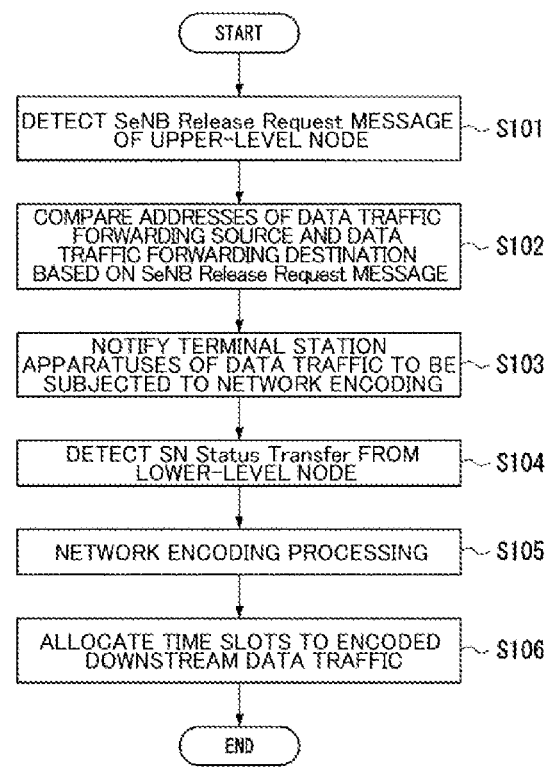
FIG. 8 is a flowchart showing an example of operations performed by the base station apparatus 10 according to the first embodiment of the present invention.

FIG. 8 is a flowchart showing an example of operations of the base station apparatus 10 according to the first embodiment of the present invention.

The base station data traffic processing unit 111 detects an SeNB Release Request message of an upper-level node (step S101). The base station data traffic processing unit 111 performs comparison of addresses of the data traffic forwarding source and the data traffic forwarding destination based on the SeNB Release Request message (step S102).

The network encoding unit 112 performs notification of the fact that the data traffic is to be subjected to network encoding to the terminal station apparatuses 20 (step S103). The base station data traffic processing unit 111 detects the SN Status Transfer messages from the lower-level nodes (step S104).

The network encoding unit 112 performs network encoding processing (step S105). The base station scheduling unit 113 performs allocation of time slots to the encoded downstream data traffic (step S106).

Then, the operations of the base station apparatus 10 indicated by the flowchart shown in FIG. 8 end.

[Processing Flow of Functional Units in Terminal Station Apparatus]

The following indicates an example of operations of functional units of the terminal station apparatus 20 in transmission processing through network encoding.

Figure 9:
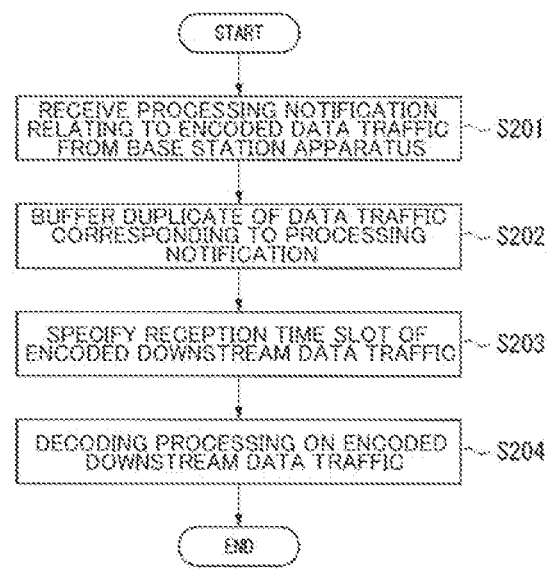
FIG. 9 is a flowchart showing an example of operations performed by the base station apparatus 10 according to the first embodiment of the present invention.

FIG. 9 is a flowchart showing an example of operations of the base station apparatus 10 according to the first embodiment of the present invention.

The network encoding/decoding unit 212 receives a processing notification relating to the encoded data traffic from the base station apparatus 10 (step S201). The terminal station data traffic processing unit 211 buffers a duplicate of the data traffic corresponding to the processing notification (step S202).

The terminal station scheduling unit 213 specifies the reception time slot of the encoded downstream data traffic (step S203). The network encoding/decoding unit 212 performs decoding processing on the encoded downstream data traffic (step S204).

Then, the operations of the terminal station apparatus 20 indicated by the flowchart shown in FIG. 9 end.

Hereinafter, an example of encoding and decoding in the wireless relay system 1 will be described.

Figure 10:
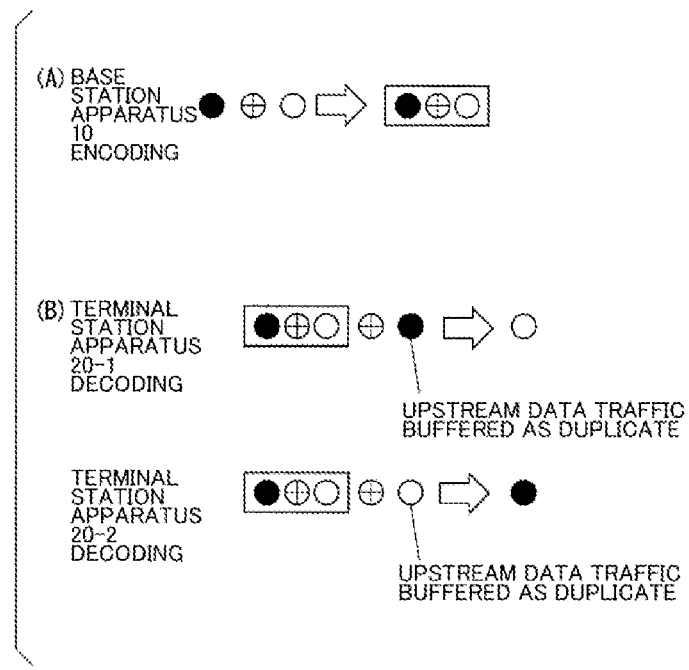
FIG. 10 is a schematic diagram showing operations for encoding and decoding in the wireless relay system 1 according to the first embodiment of the present invention.

FIG. 10 is a schematic diagram showing operations of encoding and decoding in the wireless relay system 1 according to the first embodiment of the present invention. Due to the base station apparatus 10 and the terminal station apparatuses 20 mutually ascertaining the scheme for network encoding in advance (in FIG. 10, exclusive-OR calculation (XOR calculation)), it is possible to perform network encoding processing and decoding processing.

As shown in FIG. 10(A), the base station apparatus 10 applies the exclusive-OR calculation (XOR calculation) to the bit string of the downstream data traffic to create the network-encoded data traffic (encoded data traffic). Also, as shown in FIG. 101B), the terminal station apparatuses 20 receive the encoded data traffic and perform decoding through the exclusive-OR calculation (XOR calculation) using the upstream data traffic buffered as duplicates. This enables the terminal station apparatuses 20 to extract only the needed data.

Second Embodiment

Hereinafter, a second embodiment of the present invention will be described with reference to the drawings.

Figure 11:
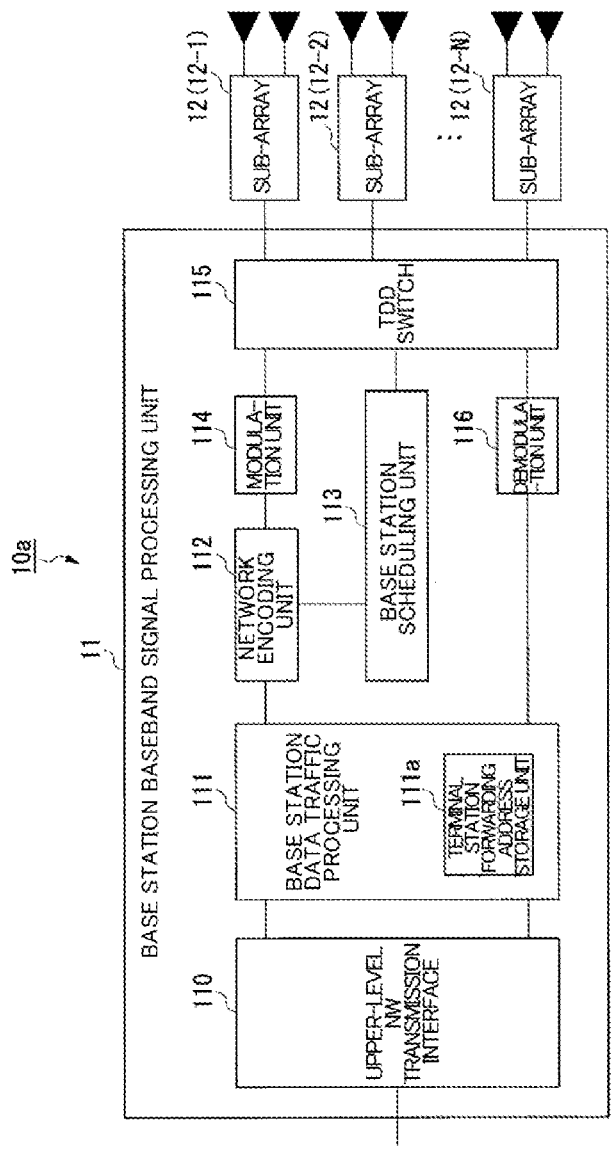
FIG. 11 is a block diagram showing a configuration of a base station apparatus of a wireless relay system according to a second embodiment of the present invention.

FIG. 11 is a block diagram showing a configuration of a base stator apparatus 10a of the wireless relay system according to the second embodiment of the present invention. In FIG. 11, the base station apparatus 10a is connected to N (N being an integer that is 3 or more) sub-arrays. The sub-arrays can form a maximum of N beams by independently performing beam forming, and thus can perform SDMA-scheme communication with N terminal static apparatuses.

The base station apparatus 10a of the wireless relay system of the second embodiment specifies the addresses of data traffic to be forwarded between the N terminal station apparatuses using a control message. Then, the base station apparatus 10a performs network encoding similar to that of the above-described first embodiment and then forwards the network-encoded data traffic (encoded data traffic) as downstream data traffic to two terminal station apparatuses 20.

As described above, if the sane network-encoded data traffic (encoded data traffic) is transmitted to the two terminal station apparatuses 20 in the base station apparatus, waveforms of the same physical layer are output in two of the N sub-arrays.

As viewed from the terminal station apparatus 20 that receives the network-encoded data traffic (encoded data traffic), there are N−1 sub-arrays (beams) of the base station apparatus 10a with interference applied at the same frequency, and therefore the interference power during reception is reduced and the communication quality of the wireless relay system can be improved.

Note that in the second embodiment, the functional blocks forming the base station apparatus 10a and the functional blocks forming the terminal station apparatus 20 are similar to those of the first embodiment, and therefore detailed description thereof is omitted.

As described above, in the wireless relay system 1 according to the above-described embodiments, the base station apparatus 10 monitors the addresses of the forwarding data traffic (e.g., forwarding from the terminal station apparatus 20-1 to the terminal station apparatus 20-2). If there are pieces of data traffic that require forwarding in opposing directions in two terminal station apparatuses 20, the base station apparatus 10 performs encoding processing such that the pieces of downstream data traffic to the two terminal station apparatuses 20 have the same content as each other, then converts the data traffic into modulated symbols in the physical layer, and transmits the pieces of data traffic at the same time.

Due to the notification from the base station apparatus 10, if there is another terminal station apparatus 20 that possesses data traffic that requires forwarding in the opposite direction to the terminal station apparatus 20, the terminal station apparatus 20 buffers its own upstream data traffic. Next, the terminal station apparatus 20 can receive the downstream data traffic resulting from encoding processing, and thereafter, can read out the forwarding data traffic forwarded from the other terminal station apparatus 20 by performing decoding processing using the buffered upstream data traffic.

Although the terminal station apparatus 20-1 and the terminal station apparatus 20-2 in which interference can occur in downstream transmission receive radio waves of a desired azimuth and radio waves of azimuths that are different from the desired azimuth, due to the fact that the modulated symbols ere identical in the physical layer, the radio waves can be treated as delay waves having a signal correlation. Thus, it is possible to remove the influence through signal processing such as reception equalization and the wireless communication quality can be ensured between the base station apparatus 10 and the terminal station apparatuses 20.

By including the above-described configuration, the wireless relay system 1 according to the above-described embodiment can reduce the influence of interference caused by grating lobes of beams in multiple azimuths, and can improve the communication quality of the communication in the terminal station apparatus 20.

Some or all of the base station apparatus 10 and the terminal station apparatuses 20 of the above-described embodiments may also be realized by a computer. In this case, a program for realizing the function may also be stored in a computer-readable storage medium, and the program stored in the storage medium may be realised by being road out and executed in a computer system. Note that a "computer system" In this context is assumed to include hardware such as an OS, a peripheral device, and the like. Also, the "computer-readable storage medium" refers to a transportable medium such as a flexible disk, a magneto-optical disk, a ROM, or a CD-ROM, and a storage apparatus such as a hard disk built in a computer system. Furthermore, a "computer-readable storage medium" may also encompass a storage medium that dynamically holds a program for a short amount of time, such as a communication wire when transmitting a program via a network such as the Internet or a communication line such as a telephone line, end a storage medium that stores a program for a certain amount of time, such is a volatile memory in a computer system serving as a server or a client in this case. Also, the above-described program may also be for realizing a portion of the above-described functions, the above-described functions may also be able to be realized in combination with a program already snored in a computer system, and may also be realized using hardware such as a PLD (Programmable Logic Device) or an FPGA (Field Programmable Gate Array).

Although embodiments of the present invention were described above with reference to the drawings, it is clear that the above-described embodiments are merely illustrative examples of the present invention and the present invention is not limited to the above-described embodiment. Accordingly, addition, omission, replacement, and other modifications of the constituent elements may also be performed without departing from, the technical idea and gist of the present invention.

REFERENCE SIGNS LIST

1 Wireless relay system
10 Base station apparatus
11 Base station baseband signal processing unit
12 Sub-array
12 Sub-array
14 Modulation unit
15 TDD switch 20 Terminal station apparatus
21 Terminal station baseband signal processing unit
22 Sub-array
110 Upper-level NW transmission interface
111 Base station data traffic processing unit
111a Terminal station forwarding address storage unit
112 Network encoding unit
113 Base station scheduling unit
114 Modulation unit
115 TDD switch
116 Demodulation unit
210 Lower-level NW transmission interface
211 Terminal station data traffic processing unit
211a Network encoding/decoding duplicate buffer
212 Network encoding/decoding unit
213 Terminal station scheduling unit
214 Demodulation unit
215 TDD switch
216 Modulation unit

The invention claimed is:

1. A wireless relay system including a plurality of terminal station apparatuses and a base station apparatus configured to relay data traffic transmitted through wireless communication between the plurality of terminal station apparatuses, wherein the base station apparatus includes:
a processor; and
a storage medium having computer program instructions stored thereon, when executed by the processor, perform to:
receive pieces of upstream data traffic from the plurality of terminal station apparatuses; if the pieces of upstream data traffic that require mutual forwarding in opposing directions between the plurality of terminal station apparatuses are present in the respective pieces of upstream data traffic, perform network encoding on the respective pieces of upstream data traffic such that the pieces of upstream data traffic are pieces of data traffic of mutually identical content; and simultaneously transmit pieces of encoded data traffic indicating the pieces of data traffic subjected to network encoding as downstream data traffic to the plurality of terminal station apparatuses that transmitted the pieces of upstream data traffic, and
wherein the terminal station apparatuses each include:
a processor; and
a storage medium having computer program instructions stored thereon, when executed by the processor, perform to:
transmit the upstream data traffic to the base station apparatus; receive the pieces of encoded data traffic transmitted from the base station apparatus; and decode the pieces of encoded data traffic using the upstream data traffic.

2. The wireless relay system according to claim 1, wherein the computer program instructions of the base station apparatus further performs network encoding by calculating exclusive-OR for a bit string of the pieces of upstream data traffic, and the decoding unit performs decoding by calculating exclusive-OR for the pieces of encoded data traffic and the upstream data traffic.

3. The wireless relay system according to claim 1, wherein the computer program instructions of the base station apparatus further perform to transmits the pieces of encoded data traffic to the plurality of terminal station apparatuses by performing beam forming.

4. The wireless relay system according to claim 1, wherein the base station apparatus performs communication with the plurality of terminal station apparatuses using a communication scheme according to a space-division multiple access scheme.

5. The wireless relay system according to claim 1, wherein the base station apparatus and the terminal station apparatuses perform communication with each other using a communication scheme according to a time-division duplexing scheme.

6. The wireless relay system according to claim 1, wherein the data traffic includes a control signal to be used for handover between the plurality of terminal station apparatuses.

7. A wireless relay method performed by a wireless relay system including a plurality of terminal station apparatuses and a base station apparatus configured to relay data traffic transmitted through wireless communication between the plurality of terminal station apparatuses, the method comprising: a terminal station transmission step in which the terminal station apparatuses transmit pieces of upstream data traffic to the base station apparatus; a base station reception step in which the base station apparatus receives the pieces of upstream data traffic from the plurality of terminal station apparatuses; an encoding step in which, if the pieces of upstream data traffic that require mutual forwarding in opposing directions between the plurality of terminal station apparatuses are present in the respective pieces of upstream data traffic received through the base station reception step, the base station apparatus performs network encoding on the respective pieces of upstream data traffic such that the pieces of upstream data traffic are pieces of data traffic of mutually identical content; a base station transmission step in which the base station apparatus simultaneously transmits respective pieces of encoded data traffic indicating the pieces of data traffic subjected to network encoding through the encoding step as downstream data traffic to the plurality of terminal station apparatuses that transmitted the pieces of upstream data traffic; a terminal station reception step in which the terminal station apparatuses receive the pieces of encoded data traffic transmitted from the base station apparatus; and a decoding step in which the terminal station apparatuses decode the pieces of encoded data traffic received through the terminal station reception step using the pieces of upstream data traffic transmitted through the terminal station transmission step.

8. A base station apparatus configured to relay data traffic transmitted through wireless communication between a plurality of terminal station apparatuses, the base station apparatus comprising:
a processor; and
a storage medium having computer program instructions stored thereon, when executed by the processor, perform to:
receive pieces of upstream data traffic from the plurality of terminal station apparatuses; if the pieces of upstream data traffic that require mutual forwarding in opposing directions between the plurality of terminal station apparatuses are present in the respective pieces of upstream data traffic, perform network encoding on the respective pieces of upstream data traffic such that the pieces of upstream data traffic are pieces of data traffic of mutually identical content; and simultaneously transmit pieces of encoded data traffic indicating the pieces of data traffic subjected to network encoding as downstream data traffic to the plurality of terminal station apparatuses that transmitted the pieces of upstream data traffic.

* * * * *